United States Patent [19]

Hobley et al.

[11] 4,193,631
[45] Mar. 18, 1980

[54] HEAD/NECK SUPPORT FOR VEHICLE SEATS

[75] Inventors: William J. Hobley, Coventry; William I. M. Rollason, Balsall Common, Nr. Coventry, both of England

[73] Assignee: Chrysler United Kingdom Limited, London, England

[21] Appl. No.: 889,546

[22] Filed: Mar. 23, 1978

[30] Foreign Application Priority Data

Mar. 25, 1977 [GB] United Kingdom ............... 12764/77

[51] Int. Cl.² .............................................. A47C 1/10
[52] U.S. Cl. ................................................... 297/408
[58] Field of Search ........................ 297/399, 408, 409

[56] References Cited

U.S. PATENT DOCUMENTS

| | | | |
|---|---|---|---|
| 1,594,408 | 8/1926 | Emmert | 297/408 |
| 1,594,409 | 8/1926 | Emmert | 297/408 |
| 3,328,082 | 6/1967 | Lilleso | 297/399 |
| 3,506,306 | 4/1970 | Herzer et al. | 297/408 |

FOREIGN PATENT DOCUMENTS 25250139 12/1976 Fed. Rep. of Germany .......... 297/408

Primary Examiner—James C. Mitchell
Attorney, Agent, or Firm—Mawhinney & Mawhinney & Connors

[57] ABSTRACT

A head/neck support for a vehicle seat comprises a cushioned head rest having a support frame which is mounted on a spindle attached to the upper end of a post projecting from the seat back. The spindle carries two spaced detents engageable with two members of the frame spaced along the spindle to lock the frame against rotation around the spindle, the head rest being released for adjustment by bodily moving the rest along the spindle against the action of a return spring to release the detents and then turning the rest to the required attitude and releasing it to allow the spring to return it along the spindle to re-engage the detents.

10 Claims, 4 Drawing Figures

HEAD/NECK SUPPORT FOR VEHICLE SEATS

BACKGROUND TO THE INVENTION

1. Field of the Invention

The invention relates to head/neck supports for mounting on motor vehicle seat back.

2. Description of the Prior Art

U.S. Pat. No. 3,328,082 discloses a head rest adapted to be mounted on the top of a back rest of a seat comprising a pillow body supported on a U-shaped frame the ends of which are mounted on a shaft which is itself mounted on two bracket members which have dependent clamping members for engaging over the seat back. In order to adjust the frame to a plurality of tilted positions, a latch mechanism is provided having an arcuate member fixed to one of the bracket members and provided adjacent its periphery with a plurality of holes adapted to be selectively engaged by a latch pin on one arm of the frame member. A pin projecting from one end of the spindle carries an abutment which engages the limb of the frame member on which the detent is formed so that by depressing the pin, the limb of the frame member is bent slightly and the detent is released from the arcuate plate to permit the head rest to be adjusted.

The arrangement described suffers from a number of dis-advantages. Firstly and most seriously, the head rest frame is locked against rotation adjacent one end only leaving the other end free to pivot and so if the passenger's head were forced rapidly back against the head rest, the head rest would merely twist and would not provide adequate restraint. Also the pillow enclosing the frame has to be provided with a slit extending into one end of the pillow to provide access to the head of the pin for releasing the locking mechanism and the stretching of the pillow to enable the user's hand to be inserted into the slit is likely to damage the pillow after a period of use. Finally the arrangement of clamping members fitting over the seat back do not provide a rigid support for the head rest which would be capable of withstanding the backward whiplash movement of a passenger's head which can occur in the event of a crash.

The object of the applicant's invention is therefore to provide a construction in which a head/neck support for a vehicle seat is capable of withstanding the backward whiplash movements of a passenger's head in the event of a crash and is also capable of easy adjustment in a manner which is not likely to cause undue wear and tear to the upholstered part of the support.

SUMMARY OF THE INVENTION

A head/neck support for a vehicle seat having a seat back comprising a post for mounting on the seat back, a spindle fixed to one end of the post and extending transversely to the post, a head/neck rest having a frame including a pair of spaced walls provided with holes which receive and mount the frame on the spindle for limited axial and rotational movement with respect to the spindle, each of said walls having a plurality of apertures spaced in an arc around the spindle hole, two pins extending radially of the spindle at spaced locations along the spindle and having projecting detents at their radially outer ends facing in one direction along the spindle to engage in selected apertures in the two respective walls of the head rest frame to hold the frame against rotation and spring means acting between the frame and the spindle for biassing the frame along the spindle in a direction to hold the detents in engagement with the respective apertures in the walls, the head rest being adjusted by movement of the frame along the spindle against the action of the spring means to release the detents from the apertures and then rotated to the required position and released to re-engage the detents with apertures in the walls corresponding to the new attitude of the head rest.

DESCRIPTION OF THE PREFERRED EMBODIMENTS

Figure 1:
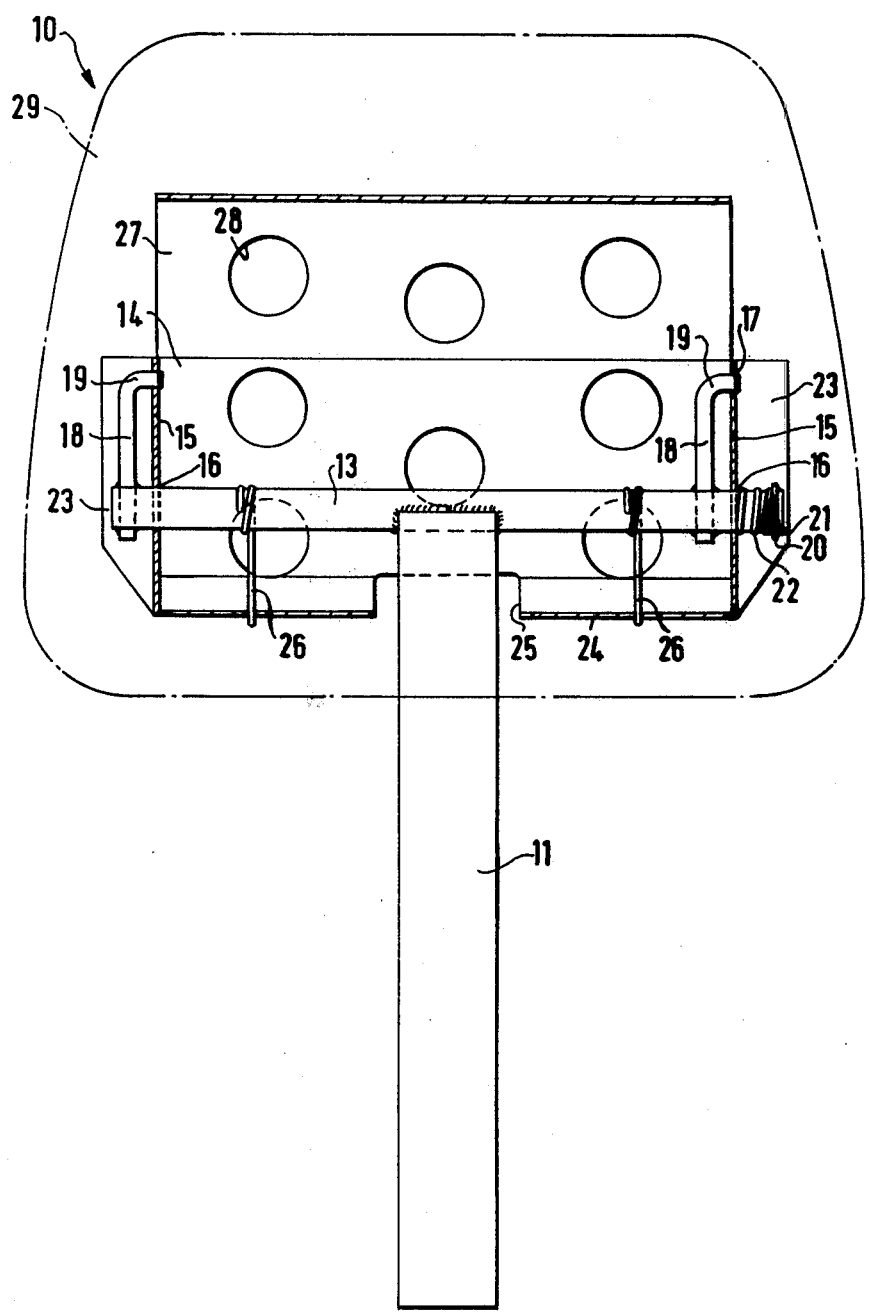
FIG. 1 is a part-sectional front view of a vehicle seat head rest.
Figure 2:
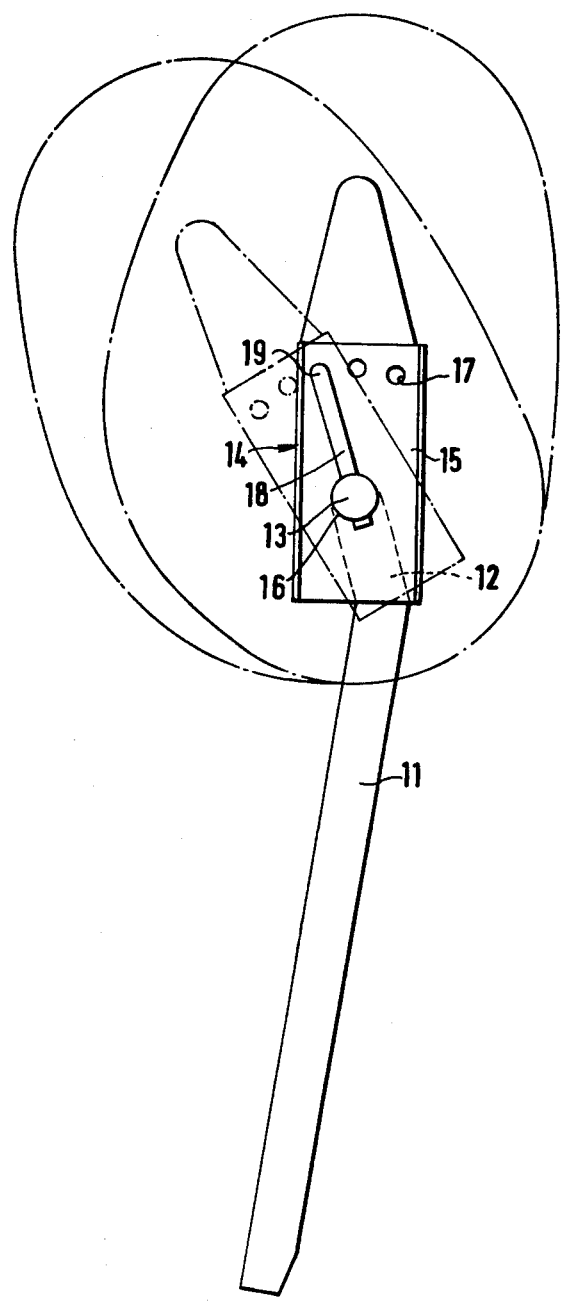
FIG. 2 is a side view of the head rest of FIG. 1.

Referring to the FIGS. 1 and 2, there is shown a head/neck support for a vehicle seat comprising a head/neck rest indicated generally at 10 mounted on a flat sided tubular section post 11 the lower end of which is fixed in a socket in the vehicle seat in conventional manner. As can be seen in FIG. 2, in use, the post extends upwardly and rearwardly generally in line with the seat back and the upper end portion 12 of the post is inclined forwardly. The top of the post is welded to horizontal spindle 13 extending transversely to the post equi-distantly on either side of the post.

The head rest 10 has a frame in the form of a narrow elongate box structure 14 having end walls 15 provided with openings 16 through which the spindle 13 extends to mount the frame on the spindle both for rotation and axial sliding movement along the spindle. Each end wall 15 is formed with three further holes 17 spaced arcuately around the holes 16. Two rigid pins 18 extend transversely through and are fixed in the spindle 13 adjacent the left hand sides of the end walls 15 as viewed in FIG. 1. The pins 18 extend radially from the spindle 13 and the outer end portions 19 of the pins are turned to project parallel to the spindle 13 to engage in one hole 17 in the respective end walls 15 of the frame to locate the frame in a particular position of rotation of adjustment around the spindle 13.

It will be appreciated that the frame 14 may be slid to the right as viewed in FIG. 1 to disengage the ends 19 of the pins from the holes 17 and the frame may then be rotated around the spindle to adjust the attitude of the head rest with respect to the spindle and, by re-engaging the ends 19 in appropriate holes 17 in the end walls, can then be re-located in the required position of adjustment.

The right hand end of the spindle which projects through the end wall 15 at the right hand end of the frame carries a washer 20 secured thereto by welding 21 and a compression spring 22 acts between the washer and the adjacent end wall 15 to bias the frame 14 in a direction to the left along the spindle 13 as viewed in FIG. 1 to hold the pin ends 19 in engagement in the holes 17.

At the left hand end of the frame 14 the pin 18 is located on the outer side of the end wall 15 and the pin 18 and projecting end of the spindle 13 are enclosed in a channel 23 secured to the end of the frame 14. A similar channel 23 is secured to the outer side of the other end wall 15 of the frame to enclose the projecting end of the spindle 13, washer 21 and spring 22.

The lower side of the frame 14 is closed by a bottom wall 24 having a central aperture 25 through which the post 11 extends. The rotation of the frame 14 on the spindle is limited by engagement of the post 11 with either side of the aperture.

The frame 14 is biassed in one direction of rotation around the spindle 13 by springs 26 acting between the spindle and the bottom wall 24 of the frame so that when the frame is released from the detent pins 18, the frame is biassed by the springs into the forward position of tilt illustrated in FIG. 2.

The front and rear walls 27 of the frame are formed with lightening holes 28 and converge in V-formation at the upper end of the frame. The frame is fully enclosed in resilient padding 29 which defines the shape of the head/neck support and which, in turn, is covered with a suitable upholstery material.

Figure 3:
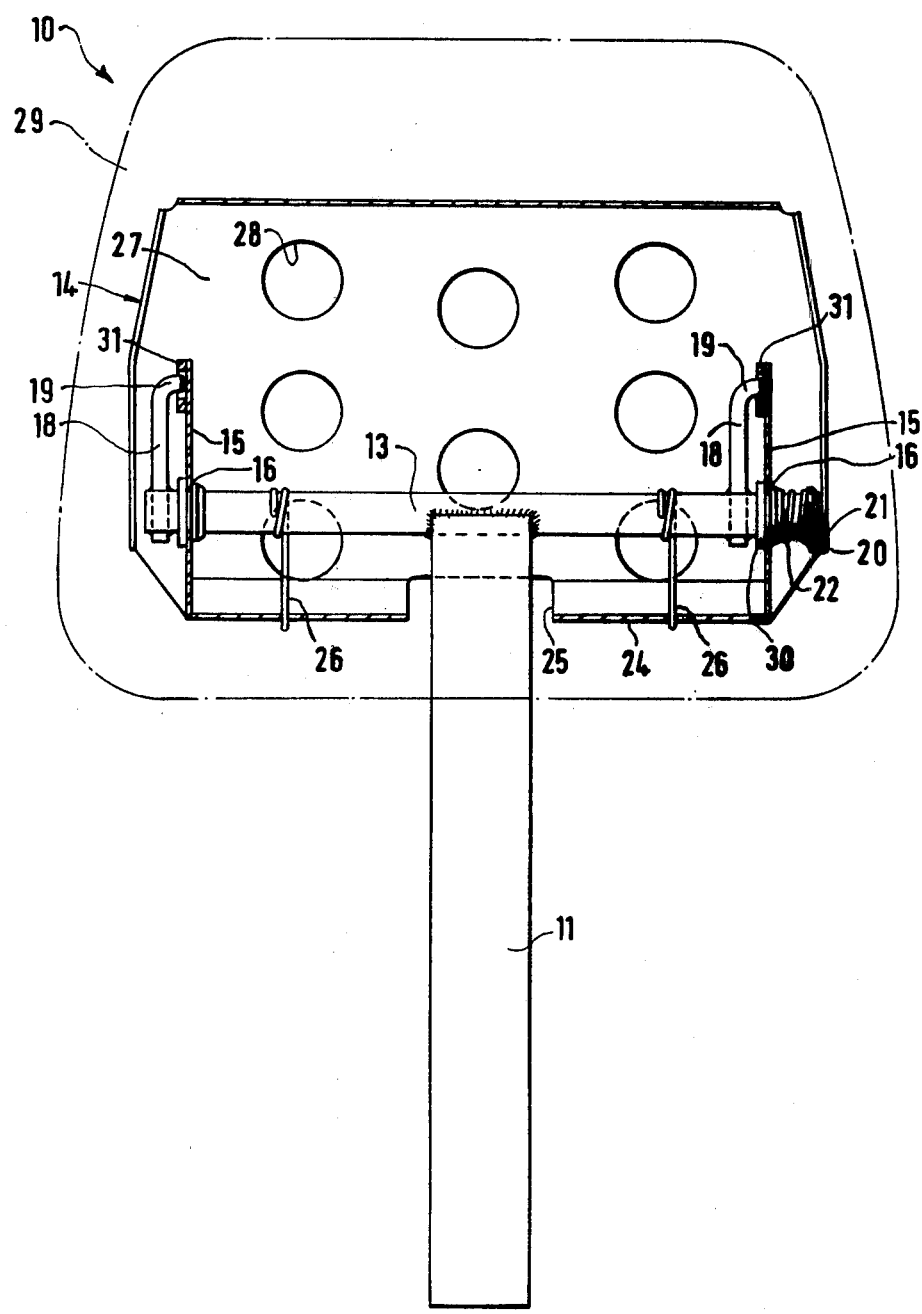
FIG. 3 is a part-sectional front view of a modified form of the vehicle seat head rest of FIGS. 1 and 2.
Figure 4:
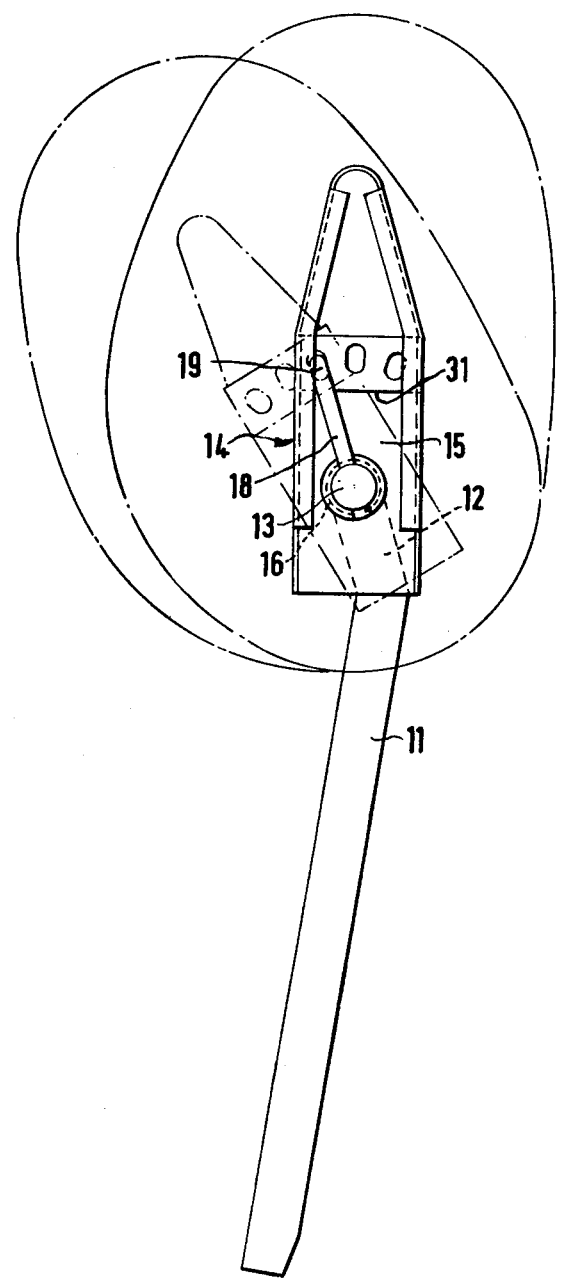
FIG. 4 is a side view of the head rest of FIG. 3.

FIGS. 3 and 4 show a modification of the above arrangement in which, the end walls 15 of the box structure 14 are stepped inwardly of the side edges of the front and rear walls of the frame and the channels 23 are omitted. No part of the spindle projects beyond the side edges of the front and rear walls and the latter are formed with inturned flanges to close partially the ends of the box structure.

In the modified arrangment shown in FIG. 3 and 4 the spindle 13 is supported in nylon bushings 30 mounted in the holes 16. The holes 17 are omitted and nylon blocks 31 are mounted on the end walls 15 having apertures to receive and hold the end portions 19 of the pins 18 for different positions of adjustment of the head rest.

We claim:

1. A head/neck support for a vehicle seat having a seat back comprising a post for mounting on the seat back, a spindle fixed to one end of the post and extending tranversely to the post, a head/neck rest having a rigid supporting frame including a pair of spaced walls provided with holes which receive and mount the frame on the spindle for rotational movement with respect to the spindle and for free axial sliding movement of the frame along the spindle, each of said walls having a plurality of apertures spaced in an arc around the spindle hole, two pins fixed to and extending radially of the spindle at spaced locations along the spindle and having projecting detents at their radially outer ends facing in one direction along the spindle to engage in selected apertures in the two respective walls of the rigid supporting frame to hold the frame against rotation and spring means acting between the frame and the spindle for biassing the frame along the spindle in a direction to hold the detents in engagement with the respective apertures in the walls, the head rest being adjusted by axial bodily movement of the frame along the spindle against the action of the spring means to release the detents from the apertures and then rotated to the required position and released to return the frame axially along the spindle and re-engage the detents with apertures in the walls corresponding to the new attitude of the head rest.

2. A head/neck support as claimed in claim 1 wherein the radially outer end of each pin is turned to extend parallel to the spindle axis to provide the detent for engaging in one of the apertures of the end wall.

3. A head/neck supportas claimed in claim 1 wherein the apertures in said walls of the rigid supporting frame for receiving the detents on the pins are formed by holes through the end walls.

4. A head/neck support as claimed in claim 1 wherein the apertures in said walls of the rigid supporting frame for receiving the detents on the pins are formed in plastics blocks mounted on the end walls.

5. A head/neck support as claimed in claim 1 wherein plastics bushes are mounted in the holes in the spaced walls of the frame to receive the spindle.

6. A head/neck support as claimed in claim 1 wherein the frame comprises a hollow elongate box-like structure having end walls which provide said pair of spaced walls.

7. A head/neck support as claimed in claim 1 wherein the frame comprises a hollow box-like structure having a pair of spaced internal walls providing said pair of spaced walls.

8. A head/neck support as claimed in claim 7 wherein the post extends through an aperture in the box-like structure to connect to the spindle within the structure and rotation of the head rest around the spindle is limited by engagement of the sides of the aperture with the post.

9. A head/neck support as claimed in claim 1 wherein the spring means to bias the head rest in one direction along the spindle comprises a compression spring acting between a washer on the spindle and one of said pair of spaced walls of the frame of the head rest.

10. A head neck support as claimed in claim 1 having a forward side for receiving the user's head and a rearward side, wherein a second spring means is provided acting between the spindle and the headrest to bias the headrest forwardly around the spindle when the detent is released and to permit the headrest to be pushed rearwardly around the spindle against the action of the second spring means when the detent is released.

* * * * *